Patented Nov. 13, 1934

1,980,549

UNITED STATES PATENT OFFICE 1,980,549

C-SUBSTITUTED PYRIMIDINES OF THE ANTHRAQUINONE SERIES

Heinrich Raeder, Leverkusen-Schlebusch, Germany, assignor to General Aniline Works, Inc., New York, N. Y., a corporation of Delaware No Drawing. Application June 1, 1932, Serial No. 614,845. In Germany June 3, 1931

2 Claims. (Cl. 260—32)

The present invention relates to a process of preparing C-substituted pyrimidines of the anthraquinone series, and to the new products obtainable by said process.

It was found that, when heating alpha-aminoanthraquinones or substitution products or derivatives thereof in the presence or absence of a suitable organic solvent with an acid alkyl imide halogenide, the reaction performs in a manner that, under escape of hydrohalic acid, an intermediate condensation product is formed first, which corresponds to an acidylation product, and moreover, that pyrimidine ring closure occurs while splitting off the alcohol corresponding to $R_2$, as shown in the following equation:—

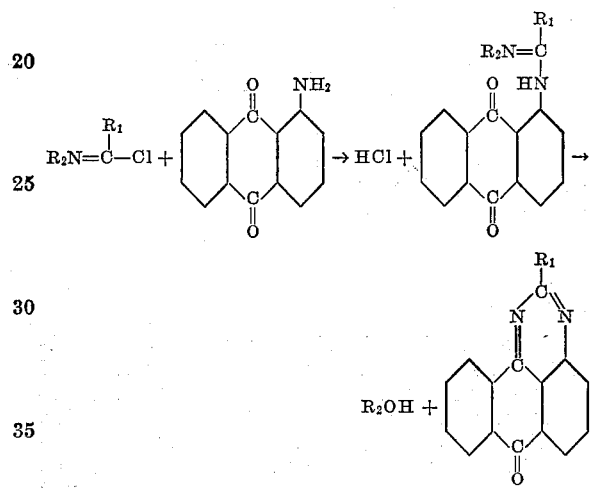

Thus are obtained salts of anthrapyrimidines with the hydrohalic acid being split off during the reaction. These salts are transformed into the free anthrapyrimidines either by prolonged heating of the reaction mixture or by adding an alkaline medium to the mixture.

To perform this reaction it is not necessary to start with the finished acid alkyl imide halogenides themselves, but it is also possible to use the acid alkyl amides, provided that simultaneously agents being capable to form the imide halogenides from the acidalkylamides are added to the reaction mixture. Agents of this type are, for example, phosphorus chlorides, phosphorus bromides, phosphorus oxychloride and thionylchloride.

The products thus obtainable are partly dyestuffs of good fastness properties, or they are valuable starting materials for the manufacture of dyestuffs.

The following examples will illustrate the invention without, however, limiting it thereto, the parts being by weight:—

Example 1

5 parts of 1-amino-4-chloroanthraquinone are heated in 35 parts of nitrobenzene with 5 parts of N-methyl-benzimide chloride at a temperature of 85 to 95° C. The reaction product soon separates as chlorohydrate in thick crystals, splitting off the hydrochloric acid with the formation of the free base, when heated for about one hour. The reaction product thus obtained is most probably the 4-chloro-C-phenyl-1.9-anthrapyrimidine of the formula:—

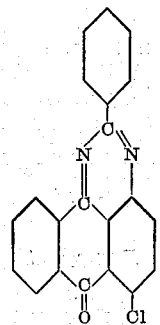

It dissolves in pyridine with a light yellow, and in concentrated sulfuric acid with a yellowish-orange coloration. Its melting point is 236–237° C. In an analogous manner 4-benzoylamino-C-phenyl-1.9-anthrapyrimidine of the probable formula:—

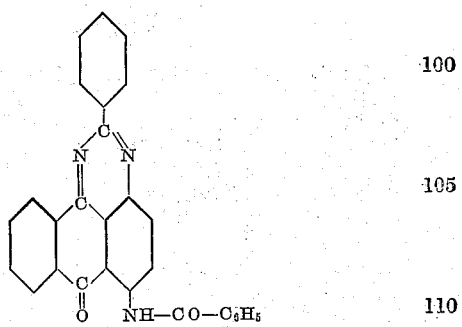

is obtained from 1-amino-4-benzoylaminoanthraquinone. The new product forms a bronze-yellow compound, dissolving in concentrated sulfuric acid with an orange coloration and dyeing cotton from an alkaline hydrosulfite vat yellow shades of good fastness properties.

When treating the product with sulfuric acid the benzoylamino group is saponified with the formation of the corresponding amino product, which possesses a melting point of 280–281° C.

Example 2

5 parts of 1-amino-5-benzoylaminoanthraquinone are heated to 100–115° C. in 35 parts of nitrobenzene with 4 parts of N-ethyl-benzimide chloride for about ½ to ¾ of an hour. The chlorohydrate of the reaction product thus formed is decomposed by means of pyridine. The reaction product thus obtained is most probably the 5-benzoylamino-C-phenyl-1.9-anthrapyrimidine of the formula:—

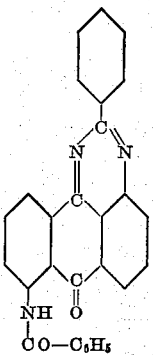

It forms yellow needles, dissolving in concentrated sulfuric acid with a yellowish-orange coloration. On heating of the sulfuric acid solution, the benzoylamino group is saponified. The benzoylamino compound above mentioned dyes cotton from a red alkaline hydrosulfite vat clear golden-yellowish shades of good fastness properties.

Example 3

6 parts of thionylchloride and 10 parts of chlorobenzene are caused to drop into a mixture of 30 parts of chlorobenzene, 8.5 parts of 1-amino-4-benzoylamino-anthraquinone and 6 parts of N-methylbenzamide. The reaction mixture is then slowly heated to 90–95° C., until the reaction is complete. The reaction product thus obtained is identical to that of the second part of Example 1.

Example 4

A mixture of 3 parts of alpha-naphthoic acid methylamide, 3 parts of 1-amino-4-benzoylamino-anthraquinone and 30 parts of chlorobenzene are heated to 85–90° C. Then a mixture of 5 parts of thionylchloride and 10 parts of chlorobenzene is slowly added, until the 1-amino-4-benzoylaminoanthraquinone has disappeared. 4–5 parts of pyridine are then added to the reaction mixture, whereafter the mixture is cooled, filtered and the residue washed with pyridine and methyl alcohol. The product thus obtained is most probably the 4-benzoylamino-C-naphthyl-1.9-anthrapyrimidine of the formula:

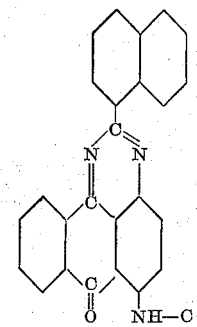

It corresponds in its properties to the corresponding phenyl derivative and dyes cotton from a reddish brown alkaline hydrosulfite vat clear yellowish dyeings of good fastness properties.

Example 5

A mixture of 6 parts of thionyl chloride and 10 parts of chlorobenzene is caused to run into a mixture of 4 parts of cinnamic acid methylamide, 5 parts of 1-amino-4-benzoylaminoanthraquinone and 35 parts of chlorobenzene under a reflux condenser and at a temperature of 120° C. After reaction is finished, pyridine is added and, furthermore, 25–30 parts of methylalcohol. A 4-benzoylamino-1.9-anthrapyrimidine is thus obtained being substituted in the pyrimidine ring by a phenyl-ethylene residue. It corresponds to the probable formula:—

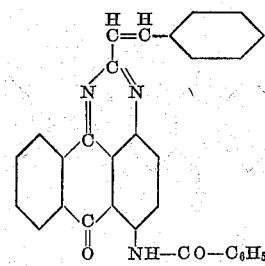

The new product dissolves in concentrated sulfuric acid with a yellowish brown coloration and dyes cotton from an alkaline hydrosulfite vat clear orange shades of good fastness properties.

When heating the sulfuric acid solution saponification of the benzoylamino group occurs.

Products of similar properties are obtained when replacing in the above example the 1-amino-4-benzoyl-amino-anthraquinone by 1-amino-5-benzoylaminoanthraquinone or the cinnamic acid methylamide by phenylacetic acid methylamide. The latter product corresponds to the probable formula:—

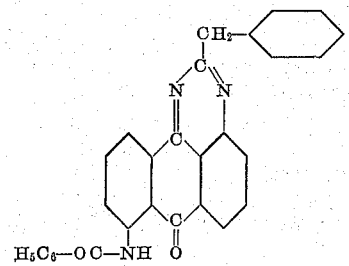

Example 6

5 parts of -chloroanthraquinone-3-carboxylic acid methylamide are slowly heated with 40 parts of chlorobenzene and 3.5 parts of phosphorus pentachloride, until a temperature of 130° C. is obtained. After cooling to a temperature of 80–90° C., 5 parts of 1-amino-4-benzoylaminoanthraquinone are added, and the temperature is maintained at about 115–120° C. for about 3 hours. 10–15 parts of pyridine are then added. The reaction mixture is cooled, filtered and the residue washed with methylalcohol. A yellow crystalline powder of 4 - benzoylamino-C-(2 - chloro-3-anthraquinonyl)-1.9-anthrapyrimidine of the probable formula:—

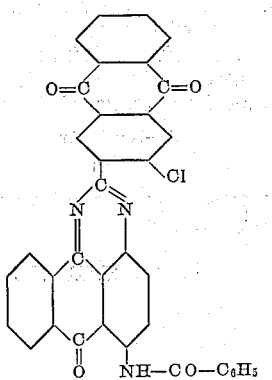

is thus obtained, dissolving in concentrated sulfuric acid with a yellow coloration. It dyes cotton from an alkaline hydrosulfite vat greenish-yellow shades of excellent fastness properties.

Example 7

A mixture of 5 parts of benzanthrone-2-carboxylic acid methylamide, 45 parts of chlorobenzene and 3.5 parts of phosphorus pentachloride are slowly heated to 130° C. After cooling the reaction mixture to 90–100° C., 5 parts of 1-amino-4-benzoylaminoanthraquinone are added, and the reaction mixture is heated to 100–110° C., until the 1-amino-4-benzoylaminoanthraquinone has disappeared. After the addition of 10 parts of pyridine, the reaction mixture is cooled and filtered. 4 - benzoylamino - C - benzanthronyl - 1,9-anthrapyrimidine of the probable formula:—

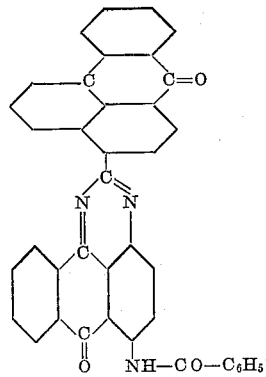

is thus obtained. It forms a yellowish compound, dissolving in concentrated sulfuric acid with a yellowish-brown coloration.

Example 8

4 parts of 4-amino-Bz-dichloro-1,2-anthraquinone-acridone, 3 parts of benzmethylimide chloride and 25 parts of nitrobenzene are heated to 90–100° C. The green solution obtained soon turns to violet-red. The reaction is finished after about 2–2½ hours. Some pyridine is then added, the reaction mixture cooled, filtered, and the residue washed with nitrobenzene. A violet powder is thus obtained, dissolving in concentrated sulfuric acid with an olive-brown coloration and with a carmine red coloration in nitrobenzene and pyridine. It is most probably the Bz-dichloro-1.2 - anthraquinone - acridone - C - phenyl-4.10-anthrapyrimidine of the formula:—

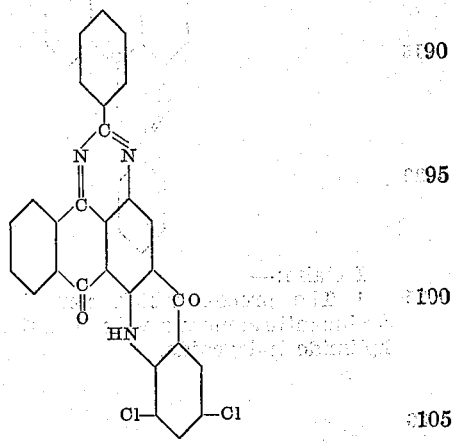

Example 9

A mixture of 4 parts of 4-amino-N-methyl-anthrapyridone, 3.5 parts of benzmethylimidechloride and 25 parts of nitrobenzene is heated to 100° C. for about 2 hours. After working up in the manner described in the above examples, yellow needles are obtained, possessing a melting point of 287–288° C. and dissolving in concentrated sulfuric acid with a reddish-yellow coloration. The new product is most probably the C-phenyl-1.9-pyrimidino-N-methyl-4.10-anthrapyridone of the formula:—

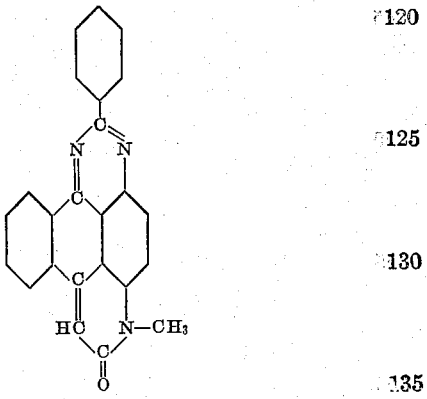

Example 10

2.5 parts of 1,5-diaminoanthraquinone are heated with 5 parts of benzmethylimide chloride and 25 parts of toluene to a temperature of 80–90° C. for 2–3 hours. After cooling, the reaction mixture is filtered by suction, the residue washed with toluene, dissolved in hot water or in very diluted hydrochloric acid, filtered and precipitated by the addition of sodium carbonate. Orange colored flakes are thus obtained, dissolving in concentrated sulfuric acid with an olive yellow coloration and with a yellow coloration in sulfuric acid of 90% strength. It crystallizes from chlorobenzene in small crystals, melting at 226° C. and is most probably the di-(C-phenyl-1,9,4,10-pyrimidino)-anthracene of the probable formula:—

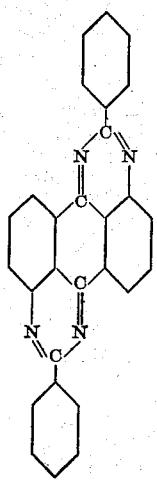

I claim:—

1. The process which comprises heating an aminoanthraquinone with a carboxylic acid alkylimide halogenide.

2. The compounds of the probable formula:—

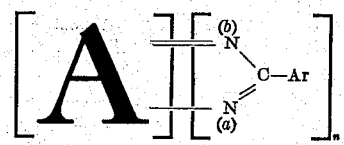

wherein A stands for an anthraquinoid radical, Ar means an aromatic radical, $n$ stands for one of the numbers 1 or 2 and wherein the nitrogen atom marked ($a$) is attached to an alpha-position of the anthraquinoid radical and the nitrogen atom marked ($b$) is attached to the meso-position vicinal to said alpha-position, said compounds being of a yellow to violet coloration, soluble in concentrated sulfuric acid and in the usual organic solvents with most various colorations these compounds being obtainable by heating an alpha-aminoanthraquinone with a carboxylic acid alkylimide halogenide of the formula:—

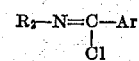

wherein Ar means an aromatic radical and $R_2$ means an alkyl group.

HEINRICH RAEDER.